United States Patent [19]

Kilbourn

[11] 4,010,410
[45] Mar. 1, 1977

[54] RECREATIONAL VEHICLE CONVERTER-BATTERY FAST CHARGING CIRCUIT

[75] Inventor: Eugene L. Kilbourn, Marshall, Mich.

[73] Assignee: Progressive Dynamics, Inc., Marshall, Mich.

[22] Filed: Apr. 9, 1975

[21] Appl. No.: 566,351

[52] U.S. Cl. .................................... 320/31; 320/39; 307/150; 321/8 R
[51] Int. Cl.² .................... H02J 7/00; H02J 9/00
[58] Field of Search ........... 307/150, 151; 321/8 R; 320/21–23, 31, 39, 40

[56] References Cited

UNITED STATES PATENTS

| | | | |
|---|---|---|---|
| 3,623,139 | 11/1971 | Dickerson | 320/39 X |
| 3,648,189 | 3/1972 | Marchetti et al. | 320/39 |
| 3,652,915 | 3/1972 | Eberts | 320/31 |
| 3,717,805 | 2/1973 | Gnaedinger et al. | 307/150 X |

Primary Examiner—Robert J. Hickey
Attorney, Agent, or Firm—Beaman & Beaman

[57] ABSTRACT

A direct current power supply system for recreational vehicles having an auxiliary chargeable battery wherein a transformer powered converter is utilized to rectify alternating current into direct current, and where the circuitry includes a battery fast charging circuit and control utilizing sensing means for automatically terminating battery fast charging upon predetermined conditions being attained. Fast charging of the battery is accomplished through a converter transformer of economical construction having a variable voltage output controlled in dependence by the fast charging operation.

11 Claims, 1 Drawing Figure

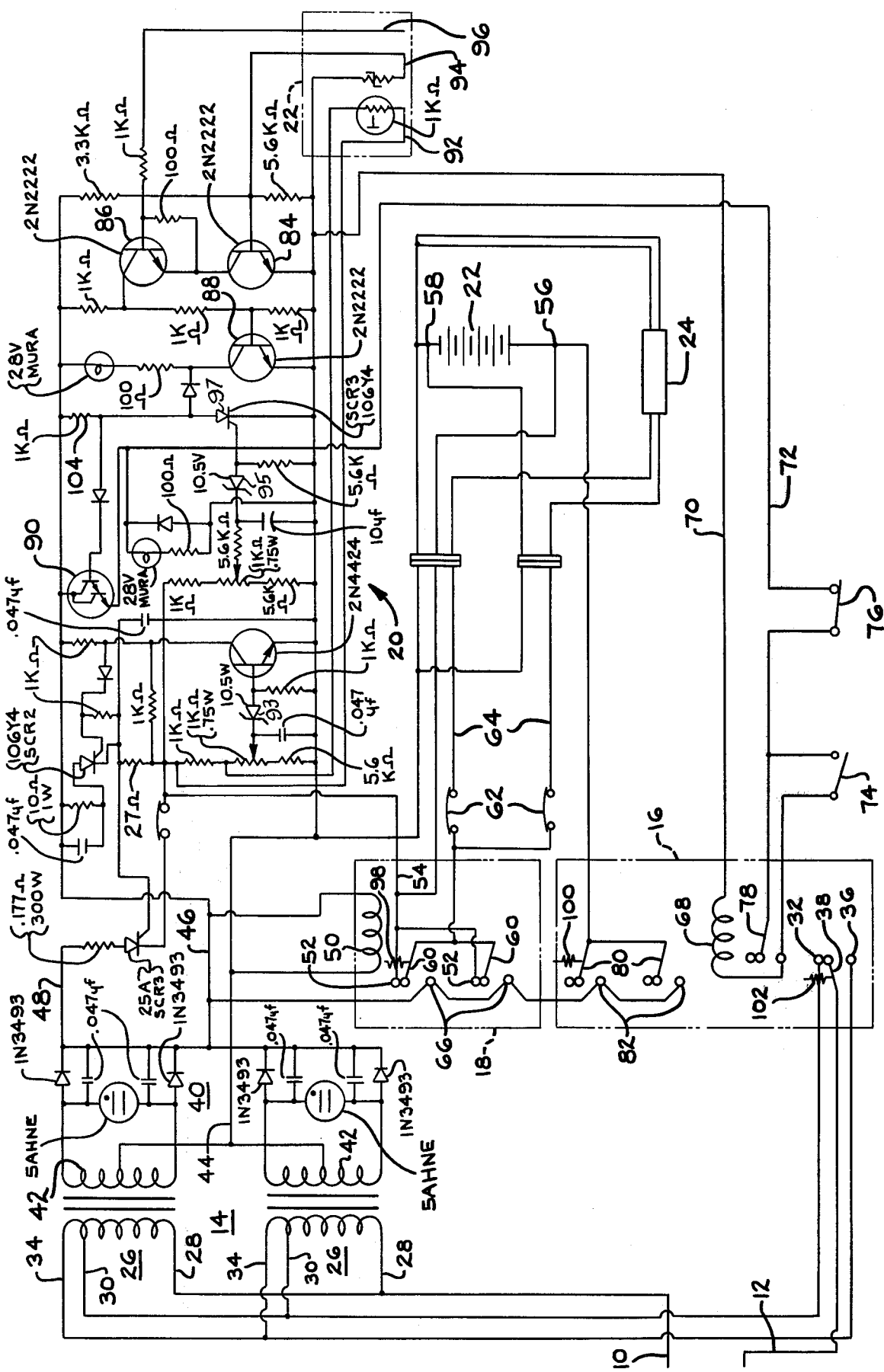

RECREATIONAL VEHICLE CONVERTER-BATTERY FAST CHARGING CIRCUIT

BACKGROUND OF THE INVENTION

The invention pertains to the field of recreational vehicle power supply systems using rechargeable battery circuits.

Recreational vehicles, such as travel trailers, motor homes, and campers, and watercraft such as boats and houseboats, are often provided wth dual electrical systems. Lights, and many of the light duty appliances, such as water pumps, usually operate at 12 volts DC, while the heavy duty equipment, such as air conditioners, television sets, and some refrigerators, require 120 volt AC electrical power. While some of the larger vehicles employ generators and auxiliary engines for producing electricity, the majority of "self-contained" recreational vehicles and boats employ auxiliary rechargeable batteries and converters to energize the unit.

A recreational vehicle converter includes a transformer having a primary coil connectible to an AC power supply. The transformer secondary coil energizes a rectifying circuit such that the converter has an approximately 12 volt direct current output which is connected to the recreational vehicle load circuit. As the vehicle battery is also of 12 volts the lighting and low voltage circuit of the recreational vehicle may be selectively powered by the battery, or the converter output. With such recreational vehicle circuits it is common to utilize means for switching between battery and converter operation, and the circuitry usually employs a slow or trickle battery charging circuit supplied from the converter output for recharging the auxiliary vehicle battery during converter operation as powered from an alternating current power source.

It is not unusual for the vehicle auxiliary battery to become substantially discharged due to extended use while the vehicle is in the field and accessibility to alternating current is not possible. Accordingly, when the vehicle is at a location where alternating current is available it is often desired to quickly bring the auxiliary battery to a fully charged condition, and, with known techniques, a battery fast charge may be connected to the vehicle alternating current supply for bringing the auxiliary battery to a full charge in a relatively short time. However, the rapid charging of wet cell rechargeable batteries presents certain well known hazards and conditions, and the rate and duration of fast charging must be closely controlled in order to prevent damage to the battery or the formation of explosive gases.

Both cost and size are significant factors in the designing of recreational vehicle electrical circuits and to utilize a plurality of transformers and rectifiers to attain selective recreational vehicle load operation, as well as permit slow and fast charging, is prohibitive in many instances, and heretofore a recreational vehicle direct current power supply system capable of both slow and fast charging has not been available which is of a minimum cost and size, dependable and safe in operation and readily operable by the unskilled.

SUMMARY OF THE INVENTION

It is an object of the invention to provide a recreational vehicle direct current power supply system utilizing a battery fast charge circuit wherein a single converter may be utilized to supply the recreational vehicle load with direct current, energize a battery slow charge circuit, and also selectively and automatically control a battery fast charge circuit.

Another object of the invention is to provide a multi-purpose converter of alternating current to direct current having high and low direct current voltage outputs automatically controlled in accordance with the operation of a battery fast charge circuit.

An additional object of the invention is to provide a recreational vehicle direct current power supply system employing a converter having a primary coil wherein the number of effective turns may be regulated to vary the voltage output of the converter in accord with the condition of operation of a battery fast charge circuit.

A further object of the invention is to provide a recreational vehicle direct current power supply system which permits a slow charge of the vehicle auxiliary battery at all times during energizing of the converter, and wherein energizing of the converter automatically connects the vehicle load circuit to the converter output and the battery fast charging circuit is controlled independently of the battery slow charge circuit.

Another object of the invention is to provide a recreational vehicle direct current power supply system utilizing a rechargeable battery and a fast charging circuit wherein the characteristics of the battery during charging are sensed, and such characteristics are utilized to automatically terminate the fast charging operation. Auxiliary vehicle battery voltage, temperature and water level are simultaneously sensed, and upon any of these three characteristics attaining a predetermined limit, fast charging of the battery automatically ceases.

Another object of the invention is to provide a recreational vehicle direct current power supply system utilizing a converter powered battery fast charge circuit which is automatically terminated upon the battery reaching predetermined conditions, and wherein initiation of the fast charging cycle is manually accomplished.

In the practice of the invention the converter transformer includes a primary coil which is tapped and is selectively connected to an alternating current power source whereby a greater or lesser number of primary coil turns may be energized. This selective operation of the primary coil ouput selectively produces high and low direct current voltages from the converter, and the battery fast charge control circuit determines the mode of connection of the primary coil to the alternating current power source. During fast charging the converter is connected to the alternating current source to produce a lower voltage direct current output, and the battery is directly connected to the converter output during the fast charging operation.

The battery voltage, temperature and water level are sensed during fast charging, and upon any of these three conditions reaching a predetermined value a relay switch is automatically actuated which simultaneously disconnects the battery from the converter output, and increases the voltage of the converter by switching the primary coil to its minimum coil energization.

The circuit includes a slow charge for the vehicle battery which is automatically slowly charging the battery whenever the converter is energized, and the fast charge control circuit utilizes a manually initiated holding switch for maintaining the fast charging operation which is under the automatic control of the fast charge control circuit as influenced by the battery sensing devices.

BRIEF DESCRIPTION OF THE DRAWING

The aforementioned objects and advantages of the invention will be appreciated from the following description and accompanying drawing wherein a recreational vehicle direct current power supply system in accord with the invention is illustrated with the switch elements shown in the battery power condition.

DESCRIPTION OF THE PREFERRED EMBODIMENT

With reference to the FIGURE, an alternating current 120 volt, 60 cycle power supply includes conductors 10 and 12. The recreational vehicle converter 14 utilizes a pair of similar transformers, which in effect, can be considered as a single transformer, and the connection of the primary coils thereof to the alternating current supply is controlled by a solenoid operated relay switch 16. The circuit includes a second solenoid operated relay switch 18 which is connected to the output of the converter, and is energized whenever the converter is connected to an alternating current source. The battery charging control circuit is generally indicated at 20, the rechargeable auxiliary vehicle battery is shown at 22, and the recreational vehicle load is indicated at 24.

The converter primary coil, or coils, 26 includes a conductor 28 connected to the conductor 10, while a conductor 30 taps into the coil at 139 turns, and the conductor 30 is connected to switch terminal 32. The conductor 34 is connected to the end of the primary coil at 167 turns, and is connected by a conductor to the switch terminal 36. As will be appreciated from the FIGURE the movable switch element 38 is connected to the AC conductor 12.

The converter rectifying circuit 40 is not described in detail as it consists of conventional solid state components for producing a direct current proportional to the voltage induced in the converter transformer secondary coil, or coils, 42 by the converter primary coil. The converter direct current output is supplied through conductors 44, 46 and 48.

The relay switch 18 includes the solenoid coil 50 connected to conductors 44 and 46 whereby the solenoid coil is energized whenever the converter is connected to an AC supply. The relay switch 18 includes terminals 52 connected to the slow charge supply conductor 54, and also connected to the auxiliary vehicle battery positive electrode 56. The battery negative electrode 58 is grounded to the vehicle. The relay switch 18 also includes the movable elements 60 which are connected to the recreational vehicle load circuit through fuses 62 and conductors 64, and the switch terminals 66 are connected to the conductor 46 supplied from the converter output whereby engagement of the elements 60 with the terminal 66 directly connects the recreational vehicle load 24 to the converter output during converter operation.

The relay switch 16 is controlled by solenoid coil 68 energized by the battery fast charge control circuit 20 through conductors 70 and 72. The coil conductor 72 includes two momentary push button switches 74 and 76, the switch 74 being normally open, and constituting the initiation switch for the auxiliary battery fast charge operation, while the normally closed switch 76 permits the fast charge operation to be manually terminated, if desired. A holding switch 78 is incorporated into the relay 16 for maintaining the coil 68 energized upon the momentary closing of the switch 74.

Direct connection of the vehicle auxiliary battery positive electrode 56 to the converter direct current output is accomplished through switch elements 80 connected to the battery positive electrode. The switch terminals 82 are connected to the converter output conductor 46. It is to be appreciated that the coil 68 simultaneously positions the switch elements 38 and 80 and holds the switch 78 closed.

The values of the components of the vehicle auxiliary battery charging circuit are indicated on the drawing, and the operation thereof will be appreciated by those skilled in the art. Unconventional portions of the system are described below.

The battery fast charge control circuit includes transistors 84, 86 and 88, and also includes an illustrated Darlington transistor 90. The transistor 90 may be replaced by a more conventional type, if desired. The charging control circuit also includes a battery voltage sensing element 92 constituting a thermistor in circuit with zener 93, a battery temperature sensing element 94, and a battery water level sensing probe 96 directly associated with battery 22. The particular design and construction of the sensing elements may be conventional and form no part of the invention. It is sufficient to recognize that the elements 92, 94 and 96 are of the type wherein the electrical characteristics thereof will vary in a known manner at predetermined battery voltages, temperature and water level, respectively, and by the use of appropriate resistances the outputs of the sensing devices may be used to produce the desired circuit operation.

In operation, the circuit components will be in the positions indicated in the drawing when the recreational vehicle load is being supplied by the auxiliary battery 22. Under such conditions the converter 14 is not connected to an alternating current power source, and thus the solenoid coil 50 will not be energized. Biasing means, in the form of a spring 98, bias the switch elements 60 to the illustrated position directly connecting the battery electrode 56 to the recreational vehicle load 24. Spring biasing means 100 will maintain the switch elements 80 of relay 16 disconnnected from the terminals 82, and thus it will be appreciated that only the vehicle battery 22 is energizing the load 24.

When the recreational vehicle is accessible to 120 volts AC the same will be connected to the conductors 10 and 12 by a conventional power cord, and the converter 14 will therefore be energized. Biasing spring 102 normally maintains the switch terminal 38 in engagement with the terminal 32, and thus the 139 turns of the primary coil 26 of the converter will be energized. Accordingly, the maximum direct current voltage output of the converter is produced, and the solenoid 50 in energized, as is the battery charging control circuit 20. Energization of the coil 50 causes the switch elements 60 to engage the converter output terminals 66 disconnecting the recreational vehicle load from the auxiliary battery, and connecting the load 24 to the converter output. The converter output is approximately 12½ to 13 volts DC, and this voltage provides the proper voltage to operate the load circuit lights and other vehicle low voltage components.

At this time there is no interconnection between the battery electrode 56 and the converter output, and such interconnection is to be avoided as the same would result in an excessive charging rate of the battery.

If it is desired to fast charge the battery 22 while the converter is in operation the operator momentarily closes switch 74, energizing coil 68, which closes holding switch 78, and maintains the energizing of the coil. Energizing of coil 68 actuates the switch element 38 to engage terminal 36 energizing the 167 turns of the converter primary coil 26. Simultaneously, the switch elements 80 contact the converter output terminals 82 directly connecting the battery positive electrode 56 to the converter output.

The switching of the converter primary coils to the 167 turns lowers the direct current voltage output of the converter at conductor 46, lowering the direct current voltage to such a value acceptable to the vehicle battery for fast charging purposes, but not so high as to damage the battery. At this time approximately 30 amperes are supplied to the battery and fast charging thereof is occurring. Simultaneously, the recreational vehicle load remains connected to the converter direct current output.

The solenoid coil 68 remains energized throughout the fast charging cycle, and as the voltage of the battery 22 approaches 15 volts, such condition will be sensed by the voltage sensing zener 95 and this voltage will be imposed upon the SCR97. Attaining the desired battery voltage causes the SCR97 to fire dropping the voltage on the transistor 90 to zero terminating conducting of the transistor de-energizing coil 68. The de-energization of the coil 68 causes the switch element 38, and the switch element 80 to return, under their associated biasing force, to the illustrated position restoring the converter to its high voltage direct current output, and disconnects the battery 22 from the converter output. The 15 volts occurring at the battery represents approximately 80% of full charge, and this degree of charge is acceptable for most purposes, and provides extended battery life. Of course, by utilizing varied resistances at the sensing means 92 various degrees of charging of the battery of 60% to 100% of charge may be obtained.

If, during the fast charging of the battery 22, the temperature within the battery exceeds a predetermined limit, for instance, 135° F., the resistor in the battery temperature sensing means 94 will change from 150,000 ohms to approximately 500 ohms, which cuts off the transistor 84. This turnoff of transistor 84 will allow the base on transistor 88 to rise and transistor 88 will then begin to conduct. This effect provides for a path that will again cause the transistor 90 to shut off due to the effective shorting of the base of the transistor 90 to ground because of the drop across the resistor 104. This action de-energizes the coil 68 to immediately disconnect the battery from the converter output, and restore the converter to its higher voltage output.

In addition to controlling the fast charging circuit by attaining a predetermined voltage, or excessive temperature rise, the lowering of the water level within the battery 22 will be sensed by the probe 96. In the event of minimum water level the transistor 86 will turn off causing the transistor 88 to turn on and therefore shut off the transistor 90 and de-energize the coil 68 to immediately terminate fast charging and restore to its normal direct current charging rate.

It will therefore be appreciated that the above described control of the coil 68 provides three separate and distinct means for automatically terminating fast charging, and the likelihood of the fast charging operation damaging the battery 22 is substantially eliminated. This type of automatic control is significantly more advantageous than using a timing motor to control fast charging as the use of a timer or timing motor has the disadvantage of possibly producing overcharging as the condition of the battery at the beginning of fast charging is difficult to accurately ascertain.

The battery charging circuit 20, through conductor 54, provides slow charging of the battery at a 9 ampere rate at all times that the converter 14 is energized. Thus, when the recreational vehicle is used for extended periods of time powered by the converter 14, the battery 22 will be fully charged, and it is not necessary for the fast charge circuit to be employed. In practice, the fast charging circuit will normally be used when the vehicle is primarily being employed in the field, and 110 volts AC is available for relatively short periods of time.

It is appreciated that various modifications to the inventive concept may be apparent to those skilled in the art without departing from the spirit and scope of the invention.

I claim:

1. A recreational vehicle direct current power supply system comprising, in combination, converter means for converting alternating current to direct current, said converter means having an alternating current input and output rectifying means selectively having a direct current output of a first normal operating voltage or a second lower fast charge voltage, an alternating current power supply connected to said converter means input, first switch means connected to said converter means selectively controlling the output voltage thereof, a rechargeable battery having positive and negative electrodes, second switch means selectively connecting said battery to said converter means output second voltage, a recreational vehicle load circuit, a battery fast charging control circuit connected to said converter means output energized thereby having a control output and connected to said battery sensing the voltage thereof, said control circuit control output operatively connected to and controlling said first and second switch means whereby said control output selectively operates said first switch means to produce said converter means second lower fast charge voltage and said second switch means to connect said battery to said converter means output second voltage, and operates said first switch means to produce said converter means first normal operating voltage and said second switch means to disconnect said battery from said converter means output second voltage when said battery attains a predetermined voltage as sensed by said fast charging control circuit, and third switch means selectively connecting said vehicle load circuit to said battery or said converter means output.

2. In a recreational vehicle direct current power supply system as in claim 1, a solenoid operating said third switch means and connected to said converter means output for energization thereby whereby said solenoid is energized upon energization of said converter means by said alternating current power supply to disconnect said vehicle load circuit from said battery and to said converter means output, and biasing means acting on said third switch means whereby de-energizing of said converter means and solenoid causes said third switch means to disconnect said vehicle load circuit from said converter means output and to said battery.

3. In a recreational vehicle direct current power supply system as in claim 1 wherein said fast charging control circuit control output energizes a solenoid operating said first and second switch means whereby energizing of said solenoid operates said first switch means to produce said second lower voltage and operates said second switch means to connect said battery to said converter means output second voltage, said charging control circuit including a holding switch operated by said solenoid and a normally open momentary switch for closing said charging control output to initially energize said solenoid and initiate fast charging of said battery.

4. In a recreational vehicle direct current power supply system as in claim 1 wherein said fast charging control circuit includes battery temperature sensing means controlling said control output to operate said control output upon the battery attaining a predetermined elevated temperature.

5. In a recreational vehicle direct current power supply system as in claim 1 wherein said fast charging control circuit includes battery water level sensing means controlling said control output to operate said control output upon the battery water attaining a predetermined level.

6. In a recreational vehicle direct current power supply system as in claim 1, a battery slow charge circuit having an input and an output, conductors connecting said slow charge input to said rectifying means output and said slow charge output to said battery whereby said slow charge circuit is energized to charge said battery upon energizing of said converter means by said alternating current power supply.

7. In a recreational vehicle direct current power supply system as in claim 1 wherein said converter means includes first and second primary coils, said first coil having a greater number of turns than said second coil, said first switch means selectively connecting said first and second coils to said alternating current power supply and connecting said first coil to said power supply during fast charging of said battery.

8. In a recreational vehicle direct current power supply system as in claim 7 wherein first and second coils include common turns and said second coil includes a conductor tapping said first coil.

9. A recreational vehicle direct current power supply system comprising, in combination, a converter for converting alternating current to direct current, said converter including a transformer having first and second primary coils and a secondary coil having an output, said first primary coil having a greater number of turns than said second primary coil, rectifying means connected to said secondary coil output having a direct current output, an alternating current power supply, first switch means selectively connecting said first and second coils to said alternating current power supply to selectively produce high and low direct current output voltages, a rechargeable battery having positive and negative electrodes, second switch means selectively connecting said battery to said direct current output low voltage, a recreational vehicle load circuit, a battery fast charging control circuit connected to said direct current output and energized thereby having a control output and connected to said battery sensing the voltage thereof, said control circuit output selectively energizing a solenoid controlling operation of said first and second switch means to disconnect said first primary coil from said power supply and said battery from said direct current output low voltage upon said battery voltage attaining a predetermined value during fast charging of said battery, such operation of said first switch means connecting said power supply to said second coil, and third switch means selectively connecting said vehicle load circuit to said battery or said direct current output, said third switch means including a solenoid connected to said direct circuit output whereby said third switch means connects said vehicle load circuit to said direct current output upon energization of said converter by said power supply.

10. In a recreational vehicle direct current power supply system as in claim 9 wherein said fast charging control circuit includes battery temperature sensing means controlling said control output to operate said control output upon the battery attaining a predetermined elevated temperature.

11. In a recreational vehicle direct current power supply system as in claim 9 wherein said fast charging control circuit includes battery water level sensing means controlling said control output to operate said control output upon the battery water attaining a predetermined level.

* * * * *